US011655317B2

(12) United States Patent
Liang et al.

(10) Patent No.: US 11,655,317 B2
(45) Date of Patent: May 23, 2023

(54) ETHYLENE-VINYL ALCOHOL COPOLYMER RESIN COMPOSITION, ETHYLENE-VINYL ALCOHOL COPOLYMER FILM FORMED THEREFROM, AND MULTILAYER STRUCTURE CONTAINING THE SAME

(71) Applicant: CHANG CHUN PETROCHEMICAL CO., LTD., Taipei (TW)

(72) Inventors: Chih Chieh Liang, Taipei (TW); Wen Hsin Lin, Taipei (TW)

(73) Assignee: CHANG CHUN PETROCHEMICAL CO., LTD., Taipei (TW)

( * ) Notice: Subject to any disclaimer, the term of this patent is extended or adjusted under 35 U.S.C. 154(b) by 0 days.

(21) Appl. No.: 17/701,219

(22) Filed: Mar. 22, 2022

(65) Prior Publication Data

US 2022/0403076 A1     Dec. 22, 2022

(30) Foreign Application Priority Data

Jun. 16, 2021  (CN) .......................... 202110666690.4
Jun. 16, 2021  (TW) ................................. 110121920

(51) Int. Cl.

| | |
|---|---|
| *C08F 216/04* | (2006.01) |
| *B32B 7/12* | (2006.01) |
| *B32B 27/08* | (2006.01) |
| *B32B 27/30* | (2006.01) |
| *B32B 27/32* | (2006.01) |
| *B32B 27/34* | (2006.01) |

(52) U.S. Cl.
CPC .............. *C08F 216/04* (2013.01); *B32B 7/12* (2013.01); *B32B 27/08* (2013.01); *B32B 27/306* (2013.01); *B32B 27/32* (2013.01); *B32B 27/34* (2013.01); *B32B 2250/24* (2013.01); *B32B 2307/538* (2013.01)

(58) Field of Classification Search
CPC ..................................................... C08F 216/04
See application file for complete search history.

(56) References Cited

U.S. PATENT DOCUMENTS

| | | | |
|---|---|---|---|
| 10,961,378 B1* | 3/2021 | Lin ......................... B32B 27/08 |
| 10,975,181 B1* | 4/2021 | Liang .................... C08F 116/06 |
| 11,124,642 B1* | 9/2021 | Su ........................... C08L 29/04 |
| 2013/0101792 A1* | 4/2013 | Pranov ................ B29C 33/3842 |
| | | | 264/225 |
| 2015/0322246 A1* | 11/2015 | Broyles ...................... C08J 5/18 |
| | | | 428/141 |
| 2016/0263868 A1 | 9/2016 | Tomoi et al. |
| 2017/0336535 A1* | 11/2017 | Shima ................. B29C 45/0005 |
| 2020/0010591 A1 | 1/2020 | Chang et al. |
| 2020/0079940 A1* | 3/2020 | Usui ...................... B32B 27/308 |
| 2021/0189113 A1* | 6/2021 | Liang ......................... B32B 1/02 |

FOREIGN PATENT DOCUMENTS

| | | |
|---|---|---|
| CN | 105764685 A | 7/2016 |
| CN | 110684305 A | 1/2020 |
| EP | 3095573 A1 | 11/2016 |
| JP | H-11291244 A | 10/1999 |
| JP | H-11294947 A | 10/1999 |
| TW | 201905067 A | 2/2019 |
| TW | 201920432 A | 6/2019 |
| WO | WO-2019/039458 A1 | 2/2019 |

* cited by examiner

*Primary Examiner* — Liam J Heincer

(74) *Attorney, Agent, or Firm* — Muncy, Geissler, Olds & Lowe, P.C.

(57) ABSTRACT

The present invention relates to an ethylene-vinyl alcohol copolymer (EVOH) resin composition, an EVOH film formed therefrom, and a multilayer structure containing the same. The surface roughness of the EVOH resin composition is the root mean square gradient (Sdq) between 0.0005 and 13. The EVOH of the invention can reduce the torque output during processing, and make the appearance of the EVOH film highly uniform.

12 Claims, No Drawings

ETHYLENE-VINYL ALCOHOL COPOLYMER RESIN COMPOSITION, ETHYLENE-VINYL ALCOHOL COPOLYMER FILM FORMED THEREFROM, AND MULTILAYER STRUCTURE CONTAINING THE SAME

BACKGROUND OF THE INVENTION

1. Technical Field

The present invention relates to an ethylene-vinyl alcohol copolymer (EVOH) resin composition. The EVOH resin composition has high surface uniformity, especially its surface roughness is the root mean square gradient (Sdq) between 0.0005 and 13. The present invention also discloses a film formed from the EVOH resin composition and a multilayer structure containing the EVOH resin composition.

2. Description of Related Art

EVOH resins are widely used in laminates for preserving perishable items. For example, EVOH resins and laminates are commonly used by the food packaging industry, medical device and supplies industry, pharmaceutical industry, electronics industry, and agrochemical industry. EVOH resins are often incorporated as a distinct layer within a laminate to serve as an oxygen-barrier layer.

The conventional EVOH pellets made of EVOH resin have large surface roughness and high friction between pellets, resulting in extremely high torque during EVOH processing. Although the processability of EVOH was adjusted by adding slip agent in the past, there is still a need for further improvement.

BRIEF SUMMARY OF THE INVENTION

In view of the continuous demand for EVOH resin that can reduce the torque output during processing and achieve high surface uniformity.

The present invention relates to an ethylene-vinyl alcohol copolymer (EVOH) resin composition, which has a surface whose roughness is the root mean square gradient (Sdq) between 0.0005 and 13. In addition, the surface roughness of the EVOH resin composition can further be the developed interfacial area ratio (Sdr) between 0.05% and 110%, the surface arithmetic mean height (Sa) between 0.003 and 1.5 μm, and/or the surface maximum trough depth (Sv) between 0.005 and 8 μm. The ethylene-vinyl alcohol copolymer resin composition includes an ethylene-vinyl alcohol copolymer resin. The EVOH resin composition can be in the form of pellet(s), film(s), fiber(s) and the like. The EVOH resin composition can be used to prepare films or multilayer structures. The inventor found that by controlling the surface roughness of EVOH pellets, the torque output during EVOH processing can be reduced, and the surface of the film formed from the EVOH resin composition and the multilayer structure containing the EVOH resin composition can exhibit high uniformity.

Furthermore, the EVOH resin composition is in the form of pellet.

Furthermore, the EVOH in the EVOH resin composition has an ethylene content of 20 to 48 mole %.

Furthermore, the EVOH in the EVOH resin composition has a saponification degree greater than 99.5 mole %.

Furthermore, the EVOH resin composition has a surface with a maximum line height (Rz) ranging from 0.02 to 15 μm.

Furthermore, the EVOH resin composition has a surface with a maximum line height (Rz) ranging from 0.02 to 9.9 μm.

Furthermore, the EVOH resin composition has a moisture content of less than or equal to 1 wt %.

Furthermore, the EVOH resin composition contains two or more ethylene-vinyl alcohol copolymers with different ethylene content.

Furthermore, the EVOH resin composition has a boron content ranging from 5 to 550 ppm.

Furthermore, the EVOH resin composition has an alkali metal content of 5 to 550 ppm.

Furthermore, the EVOH resin composition further comprises one or a combination of cinnamic acid, conjugated polyene, slip agent and alkaline earth metal.

In another aspect of the present invention, an ethylene-vinyl alcohol copolymer film formed from the above-mentioned EVOH resin composition is provided.

Furthermore, the multilayer structure includes: (a) at least one layer formed of the aforementioned ethylene-vinyl alcohol copolymer resin; (b) at least one polymer layer; and (c) at least one adhesive layer.

Furthermore, in the multilayer structure, the polymer layer is selected from the group consisting of a low-density polyethylene layer, a polyethylene grafted maleic anhydride layer, a polypropylene layer, and a nylon layer, and the adhesive layer is a tie layer.

DETAILED DESCRIPTION OF THE INVENTION

The present invention relates to an ethylene-vinyl alcohol copolymer (EVOH) resin composition, wherein the ethylene-vinyl alcohol copolymer resin composition includes an ethylene-vinyl alcohol copolymer resin. The EVOH resin composition has low surface roughness, especially the surface roughness is the root mean square gradient (Sdq) between 0.0005 and 13. In addition, the surface roughness of the EVOH resin composition can further be the developed interfacial area ratio (Sdr) between 0.05% and 110%, the surface arithmetic mean height (Sa) between 0.003 and 1.5 μm, and/or the surface maximum trough depth (Sv) between 0.005 and 8 μm. In a preferred embodiment, the Sdq of the surface of the EVOH resin composition is between 0.001 and 10; wherein the surface further has a roughness selected from one or a combination of the group consisting of Sdr ranging from 0.1% to 100%, Sa ranging from 0.005 to 0.95 μm, and Sv ranging from 0.01 to 5 μm.

The control of the surface roughness of the EVOH resin composition can be achieved by controlling the conveying method in the EVOH process so that the EVOH resin composition and the film formed therefrom have good effects. The EVOH resin composition can be used to prepare films or multilayer structures. The inventor found that by controlling the surface roughness parameter Sdq of EVOH pellets within a specific range, the torque output during EVOH processing can be reduced, the gel formation of the film and multilayer structure formed by the EVOH pellets can be improved, and the surface of the EVOH pellets can exhibit high uniformity.

The definition of the root mean square gradient (Sdq) refers to ISO 25178:2012. The Sdq refers to the parameter calculated through the root mean square gradient of all points in the defined range. The surface roughness Sdq is preferably between 0.0005 and 13. The Sdq can be, for example, between 0.0005 and 13, between 0.0005 and 12, between 0.0005 and 11, between 0.0005 and 10, between 0.0005 and 9, between 0.0005 and 8, between 0.0005 and 7, between 0.0005 and 6, between 0.0005 and 5, between 0.0005 and 4, between 0.0005 and 3, between 0.0005 and 2, between 0.0005 and 1, between 0.0005 and 0.1, between 0.0005 and 0.01, between 0.0005 and 0.001, between 0.001 and 13, between 0.001 and 12, between 0.001 and 11, between 0.001 and 10, between 0.001 and 9, between 0.001 and 8, between 0.001 and 7, between 0.001 and 6, between 0.001 and 5, between 0.001 and 4, between 0.001 and 3, between 0.001 and 2, between 0.001 and 1, between 0.001 and 0.1, between 0.001 and 0.01, between 0.05 and 13, between 0.05 and 12, between 0.05 and 11, between 0.05 and 10, between 0.05 and 9, between 0.05 and 8, between 0.05 and 7, between 0.05 and 6, between 0.05 and 5, between 0.05 and 4, between 0.05 and 3, between 0.05 and 2, between 0.05 and 1, between 0.05 and 0.1, between 0.1 and 13, between 0.1 and 12, between 0.1 and 11, between 0.1 and 10, between 0.1 and 9, between 0.1 and 8, between 0.1 and 7, between 0.1 and 6, between 0.1 and 5, between 0.1 and 4, between 0.1 and 3, between 0.1 and 2, between 1 and 13, between 1 and 12, between 1 and 11, between 1 and 10, between 1 and 9, between 1 and 8, between 1 and 7, between 1 and 6, between 1 and 5, between 1 and 4, between 1 and 3, between 3 and 13, between 3 and 12, between 3 and 11, between 3 and 10, between 3 and 9, between 3 and 8, between 3 and 7, between 3 and 6, between 3 and 5, between 5 and 13, between 5 and 12, between 5 and 11, between 5 and 10, between 5 and 9, between 5 and 8, between 5 and 7, between 7 and 13, between 7 and 12, between 7 and 11, between 7 and 10, between 7 and 9, between 7 and 8, between 9 and 13, between 9 and 12, between 9 and 11, or between 9 and 10.

The definition of the developed interfacial area ratio (Sdr) refers to ISO 25178:2012. The Sdr refers to the ratio of the developed area (surface area) of the defined range to the increase of the area of the defined range. The surface roughness Sdr is preferably between 0.05% and 110%. The Sdr can be, for example, between 0.05% and 110%, between 0.05% and 100%, between 0.05% and 90%, between 0.05% and 80%, between 0.05% and 70%, between 0.05% and 60%, between 0.05% and 50%, between 0.05% and 40%, between 0.05% and 30%, between 0.05% and 20%, between 0.05% and 10%, between 0.05% and 1%, between 0.05% and 0.1%, between 0.1% and 110%, between 0.1% and 100%, between 0.1% and 90%, between 0.1% and 80%, between 0.1% and 70%, between 0.1% and 60%, between 0.1% and 50%, between 0.1% and 40%, between 0.1% and 30%, between 0.1% and 20%, between 0.1% and 10%, between 0.1% and 1%, between 1% and 110%, between 1% and 100%, between 1% and 90%, between 1% and 80%, between 1% and 70%, between 1% and 60%, between 1% and 50%, between 1% and 40%, between 1% and 30%, between 1% and 20%, between 1% and 10%, between 10% and 110%, between 10% and 100%, between 10% and 90%, between 10% and 80%, between 10% and 70%, between 10% and 60%, between 10% and 50%, between 10% and 40%, between 10% and 30%, between 10% and 20%, between 30% and 110%, between 30% and 100%, between 30% and 90%, between 30% and 80%, between 30% and 70%, between 30% and 60%, between 30% and 50%, between 50% and 110%, between 50% and 100%, between 50% and 90%, between 50% and 80%, between 50% and 70%, between 50% and 60%, between 70% and 110%, between 70% and 100%, between 70% and 90%, between 90% and 110%, or between 90% and 100%.

The surface arithmetic mean height (Sa) is the arithmetic mean height of the surface, and its definition refers to ISO 25178:2012. This Sa represents the average surface with respect to the surface, and the absolute value average of the height difference of each point. The surface roughness Sa is preferably 0.003 to 1.5 µm. The Sa can be, for example, between 0.003 and 1.5 µm, between 0.003 and 1.3 µm, between 0.003 and 1.1 µm, between 0.003 and 0.9 µm, between 0.003 and 0.7 µm, between 0.003 and 0.5 µm, between 0.003 and 0.3 µm, between 0.003 and 0.1 µm, between 0.003 and 0.09 µm, between 0.003 and 0.07 µm, between 0.003 and 0.05 µm, between 0.003 and 0.03 µm, between 0.003 and 0.01 µm, between 0.003 and 0.009 µm, between 0.003 and 0.007 µm, between 0.003 and 0.005 µm, between 0.005 and 1.5 µm, between 0.005 and 1.3 µm, between 0.005 and 1.1 µm, between 0.005 and 0.9 µm, between 0.005 and 0.7 µm, between 0.005 and 0.5 µm, between 0.005 and 0.3 µm, between 0.005 and 0.1 µm, between 0.005 and 0.09 µm, between 0.005 and 0.07 µm, between 0.005 and 0.05 µm, between 0.005 and 0.03 µm, between 0.01 and 1.5 µm, between 0.01 and 1.3 µm, between 0.01 and 1.1 µm, between 0.01 and 0.9 µm, between 0.01 and 0.7 µm, between 0.01 and 0.5 µm, between 0.01 and 0.3 µm, between 0.01 and 0.1 µm, between 0.01 and 0.09 µm, between 0.01 and 0.07 µm, between 0.01 and 0.05 µm, between 0.01 and 0.03 µm, between 0.03 and 1.5 µm, between 0.03 and 1.3 µm, between 0.03 and 1.1 µm, between 0.03 and 0.9 µm, between 0.03 and 0.7 µm, between 0.03 and 0.5 µm, between 0.03 and 0.3 µm, between 0.03 and 0.1 µm, between 0.03 and 0.09 µm, between 0.03 and 0.07 µm, between 0.03 and 0.05 µm, between 0.05 and 1.5 µm, between 0.05 and 1.3 µm, between 0.05 and 1.1 µm, between 0.05 and 0.9 µm, between 0.05 and 0.7 µm, between 0.05 and 0.5 µm, between 0.05 and 0.3 µm, between 0.05 and 0.1 µm, between 0.05 and 0.09 µm, between 0.07 and 1.5 µm, between 0.07 and 1.3 µm, between 0.07 and 1.1 µm, between 0.07 and 0.9 µm, between 0.07 and 0.7 µm, between 0.07 and 0.5 µm, between 0.07 and 0.3 µm, between 0.07 and 0.1 µm, between 0.07 and 0.09 µm, between 0.1 and 1.5 µm, between 0.1 and 1.3 µm, between 0.1 and 1.1 µm, between 0.1 and 0.9 µm, between 0.1 and 0.7 µm, between 0.1 and 0.5 µm, between 0.3 and 1.5 µm, between 0.3 and 1.3 µm, between 0.3 and 1.1 µm, between 0.3 and 0.9 µm, between 0.3 and 0.7 µm, between 0.3 and 0.5 µm, between 0.5 and 1.5 µm, between 0.5 and 1.3 µm, between 0.5 and 1.1 µm, between 0.5 and 0.9 µm, between 0.7 and 1.5 µm, between 0.7 and 1.3 µm, between 0.7 and 1.1 µm, between 0.7 and 0.9 µm, between 0.9 and 1.5 µm, between 0.9 and 1.3 µm, or between 0.9 and 1.1 µm.

The surface maximum trough depth (Sv) is the maximum trough depth of the surface, and its definition refers to ISO 25178:2012. The Sv is the absolute value of the height of the lowest point in a defined range. The surface roughness Sv is preferably between 0.005 and 8 µm. The Sv can be, for example, between 0.005 and 8 µm, between 0.005 and 7 µm, between 0.005 and 6 µm, between 0.005 and 5 µm, between 0.005 and 4 µm, between 0.005 and 3 µm, between 0.005 and 2 µm, between 0.005 and 1 µm, between 0.005 and 0.1 µm, between 0.005 and 0.01 µm, between 0.01 and 8 µm, between 0.01 and 7 µm, between 0.01 and 6 µm, between 0.01 and 5 µm, between 0.01 and 4 µm, between 0.01 and 3 µm, between 0.01 and 2 µm, between 0.01 and 1 µm, between 0.01 and 0.1 µm, between 0.1 and 8 µm, between 0.1 and 7 µm, between 0.1 and 6 µm, between 0.1 and 5 µm, between 0.1 and 4 µm, between 0.1 and 3 µm, between 0.1 and 2 µm, between 0.1 and 1 µm, between 0.4 and 8 µm, between 0.4 and 7 µm, between 0.4 and 6 µm, between 0.4 and 5 µm, between 0.4 and 4 µm, between 0.4 and 3 µm, between 0.4 and 2 µm, between 0.4 and 1 µm, between 0.8 and 8 µm, between 0.8 and 7 µm, between 0.8 and 6 µm, between 0.8 and 5 µm, between 0.8 and 4 µm, between 0.8 and 3 µm, between 0.8 and 2 µm, between 0.8 and 1 µm, between 1 and 8 µm, between 1 and 7 µm, between 1 and 6 µm, between 1 and 5 µm, between 1 and 4 µm, between 1 and 3 µm, between 1 and 2 µm, between 2 and 8 µm, between 2 and 7 µm, between 2 and 6 µm, between 2 and 5 µm, between 2 and 4 µm, between 3 and 8 µm, between 3 and 7 µm, between 3 and 6 µm, between 3 and 5 µm, between 3 and 4 µm, between 4 and 8 µm, between 4 and 7 µm, between 4 and 6 µm, between 4 and 5 µm, between 5 and 8 µm, between 5 and 7 µm, or between 5 and 6 µm.

In one aspect, the present invention provides an EVOH resin composition. The EVOH resin composition may be in the form of pellet(s), film(s), fiber(s), and the like. The EVOH pellets mentioned herein refer to the form and/or shape of one or more pellets of the EVOH resin composition after pelletization. Although the EVOH resin composition that is pelletized to form one or more EVOH pellets is described throughout the present invention, the EVOH resin composition can also be processed into the form of beads, cubes, chips, shavings, and the like. In some embodiments, the EVOH resin composition is in the pellet form. The so-called pellet form can be columnar, granular or flat, wherein the granular shape can be spherical, elliptical or Go-shaped, and the columnar shape can be cylindrical, elliptical columnar, or angular columnar.

When EVOH pellets are spherical, elliptical, or Go-shaped, the largest outer diameter of the pellets is taken as the long side, and the largest diameter in the cross section with the largest area in the cross section perpendicular to the long side is taken as the short side. The long side can be 1.5-5.0 mm, 2.2-5.0 mm, 2.4-5.0 mm, 2.6-5.0 mm, 2.8-5.0 mm, 3.0-5.0 mm, 3.2-5.0 mm, 3.4-5.0 mm, 3.6-5.0 mm, 3.8-5.0 mm, 4.0-5.0 mm, 2.0-4.5 mm, 2.0-4.4 mm, 2.0-4.2 mm, 2.0-4.0 mm, 2.0-3.8 mm, 2.0-3.6 mm, 2.0-3.4 mm, 2.0-3.2 mm, or 2.0-3.0 mm; and the short side can be 1.5-5.0 mm, 1.8-4.6 mm, 2.4-4.6 mm, 2.6-4.6 mm, 2.8-4.6 mm, 3.0-4.6 mm, 3.2-4.6 mm, 3.4-4.6 mm, 3.6-4.6 mm, 3.8-4.6 mm, 4.0-4.6 mm, 1.6-4.5 mm, 1.6-4.4 mm, 1.6-4.2 mm, 1.6-4.0 mm, 1.6-3.8 mm, 1.6-3.6 mm, 1.6-3.4 mm, 1.6-3.2 mm, or 1.6-3.0 mm.

When EVOH pellets are cylindrical or elliptical columnar, the height can be 1.5-5.0 mm, 1.7-5.0 mm, 2.2-5.0 mm, 2.4-5.0 mm, 2.6-5.0 mm, 2.8-5.0 mm, 3.0-5.0 mm, 3.2-5.0 mm, 3.4-5.0 mm, 3.6-5.0 mm, 3.8-5.0 mm, 4.0-5.0 mm, 1.7-4.5 mm, 1.7-4.4 mm, 1.7-4.2 mm, 1.7-4.0 mm, 1.7-3.8 mm, 1.7-3.6 mm, 1.7-3.4 mm, 1.7-3.2 mm, or 1.7-3.0 mm; and the long axis of the cross section can be 1.5-5.0 mm, 1.7-5.0 mm, 2.2-5.0 mm, 2.4-5.0 mm, 2.6-5.0 mm, 2.8-5.0 mm, 3.0-5.0 mm, 3.2-5.0 mm, 3.4-5.0 mm, 3.6-5.0 mm, 3.8-5.0 mm, 4.0-5.0 mm, 1.7-4.5 mm, 1.7-4.4 mm, 1.7-4.2 mm, 1.7-4.0 mm, 1.7-3.8 mm, 1.7-3.6 mm, 1.7-3.4 mm, 1.7-3.2 mm, or 1.7-3.0 mm.

The surface roughness characteristics of the EVOH resin composition can also be described by the maximum line height (Rz) of the surface, and its definition standard refers to JIS B 0601-2001. The Rz is the sum of the height of the highest crest and the depth of the deepest trough in the profile curve on the reference length.

In one embodiment, the Rz of the surface of the EVOH resin composition may be about 0.02-15 µm, such as 0.02-15 µm, 0.02-13 µm, 0.02-11 µm, 0.02-9 µm, 0.02-7 µm, 0.02-5 µm, 0.02-3 µm, 0.02-1 µm, 0.02-0.9 µm, 0.02-0.7 µm, 0.02-0.5 µm, 0.02-0.1 µm, 0.1-15 µm, 0.1-13 µm, 0.1-11 µm, 0.1-9 µm, 0.1-7 µm, 0.1-5 µm, 0.1-3 µm, 0.1-1 µm, 0.1-0.9 µm, 0.1-0.7 µm, 0.5-15 µm, 0.5-13 µm, 0.5-11 µm, 0.5-9 µm, 0.5-7 µm, 0.5-5 µm, 0.5-3 µm, 0.5-1 µm, 0.5-0.9 µm, 0.5-0.7 µm, 0.8-15 µm, 0.8-13 µm, 0.8-11 µm, 0.8-9 µm, 0.8-7 µm, 0.8-5 µm, 0.8-3 µm, 0.8-1 µm, 1-15 µm, 1-13 µm, 1-11 µm, 1-9 µm, 1-7 µm, 1-5 µm, 1-3 µm, 3-15 µm, 3-13 µm, 3-11 µm, 3-9 µm, 3-7 µm, 3-5 µm, 5-15 µm, 5-13 µm, 5-11 µm, 5-9 µm, 5-7 µm, 7-15 µm, 7-13 µm, 7-11 µm, 7-9 µm, 9-15 µm, 9-13 µm, 9-11 µm, or 11-15 µm. In a preferred embodiment, the Rz of the surface is between 0.02 and 9.9 µm.

The EVOH pellets are formed by an EVOH with an ethylene content. For example, the ethylene content of the EVOH can range from about 20 to about 48 mole %, from about 20 to about 45 mole %, from about 25 to about 45 mole %, from about 28 to about 42 mole %, or from about 30 to about 40 mole %. The EVOH resin composition can be formed from two or more EVOHs having different ethylene contents. For example, the ethylene content of one of the EVOHs may be in the range of about 20 to about 35 mole %, such as about 24 to about 35 mole %, about 28 to about 35 mole %, about 20 to about 32 mole %, about 24 to about 32 mole %, about 28 to about 32 mole %, about 20 to about 30 mole %, or about 24 to about 30 mole %. Additionally or alternatively, the ethylene content of one of the EVOHs may be in the range of about 36 to about 48 mole %, such as about 40 to about 48 mole %, about 44 to about 48 mole %, about 36 to about 45 mole %, or about 40 to about 45 mole %. However, in some preferred embodiments, the EVOH resin composition is formed of a single EVOH having an ethylene content of about 20 to about 48 mole %.

Additionally or alternatively, the degree of saponification of the EVOH in the EVOH resin composition may be 90 mole % or higher, preferably 95 mole % or higher, preferably 97 mole % or higher, preferably 99.5 mole % or higher.

The EVOH resin composition may contain boron compounds and/or boric acid and/or cinnamic acid and/or alkali metals and/or conjugated polyenes and/or slip agents and/or alkaline earth metals, salts thereof, and/or mixtures thereof in some cases. The above-mentioned substances can give better properties to the EVOH resin composition.

In another aspect of the present invention, there is provided an EVOH resin composition (or pellets thereof), which may comprise an ethylene-vinyl alcohol copolymer and a boron compound, wherein the boron content of the EVOH resin composition is about 5-550 ppm. In some cases, the boron content of the EVOH resin composition may be about 5-550 ppm, about 5-500 ppm, about 5-450 ppm, about 5-400 ppm, about 5-350 ppm, about 5-300 ppm, about 5-250 ppm, about 5-200 ppm, about 5-150 ppm, about 5-100 ppm, about 5-50 ppm, about 10-550 ppm, about 10-500 ppm, about 10-450 ppm, about 10-400 ppm, about 10-350 ppm, about 10-300 ppm, about 10-250 ppm, about 10-200 ppm, about 10-150 ppm, about 10-100 ppm, about 10-50 ppm, about 50-550 ppm, about 50-500 ppm, about 50-450 ppm, about 50-400 ppm, about 50-350 ppm, about 50-300 ppm, about 50-250 ppm, about 50-200 ppm, about 50-150 ppm, about 50-100 ppm, about 100-550 ppm, about 100-500 ppm, about 100-450 ppm, about 100-400 ppm, about 100-350 ppm, about 100-300 ppm, about 100-250 ppm, about 100-200 ppm, about 100-150 ppm, about 200-550 ppm, about 200-500 ppm, about 200-450 ppm, about 200-400 ppm, about 200-350 ppm, about 200-300 ppm, about 200-250 ppm, about 300-550 ppm, about 300-500 ppm, about 300-450 ppm, about 300-400 ppm, about 300-

350 ppm, about 400-550 ppm, about 400-500 ppm, about 400-450 ppm, or about 500-550 ppm based on the total weight of the EVOH resin composition. Without being limited to any specific theory, it is believed that adding a boron compound to the EVOH resin composition and making the boron content of EVOH be 5 to 550 ppm reduces or eliminates the adhesion of the EVOH resin composition during the extrusion process through the screw extruder, and further improves the thickness uniformity and flexibility of the film. In some cases, such EVOH resin composition can clean the screw extruder by removing or at least partially removing the EVOH resin previously adhered to the inner surface of the screw extruder during the extrusion process, so that the material has a self-cleaning function, which can further improve the film thickness uniformity.

The boron compound may, in some instances, include boric acid or a metal salt thereof. Examples of the metal salt include, but are not limited to, calcium borate, cobalt borate, zinc borate (e.g., zinc tetraborate or zinc metaborate), potassium aluminum borate, ammonium borate (e.g., ammonium metaborate, ammonium tetraborate, ammonium pentaborate, or ammonium octaborate), cadmium borate (e.g., cadmium orthoborate or cadmium tetraborate), potassium borate (e.g., potassium metaborate, potassium tetraborate, potassium pentaborate, potassium hexaborate, or potassium octaborate), silver borate (e.g., silver metaborate or silver tetraborate), copper borate (e.g., copper (II) borate, copper metaborate, or copper tetraborate), sodium borate (e.g., sodium metaborate, sodium diborate, sodium tetraborate, sodium pentaborate, sodium hexaborate, or sodium octaborate), lead borate (e.g., lead metaborate or lead hexaborate), nickel borate (e.g., nickel orthoborate, nickel diborate, nickel tetraborate, or nickel octaborate), barium borate (e.g., barium orthoborate, barium metaborate, barium diborate, or barium tetraborate), bismuth borate, magnesium borate (e.g., magnesium orthoborate, magnesium diborate, magnesium metaborate, trimagnesium tetraborate, or pentamagnesium tetraborate), manganese borate (e.g., manganese (I) borate, manganese metaborate, or manganese tetraborate), lithium borate (e.g., lithium metaborate, lithium tetraborate, or lithium pentaborate), salts thereof, or combinations thereof. Borate mineral such as borax, kainite, inyonite, kotoite, suanite, azaibelyite, and szaibelyite may be included. Of these, borax, boric acid, and sodium borate such as sodium metaborate, sodium diborate, sodium tetraborate, sodium pentaborate, sodium hexaborate, and sodium octaborate are preferably used.

In some cases, the EVOH resin composition may further include alkali metals. The alkali metal source for the EVOH resin composition of the present invention to contain the above-mentioned alkali metal includes alkali metal compounds such as alkali metal salts, alkali metal oxides, and alkali metal hydroxides. Among them, alkali metal salts are preferred. Examples of alkali metal salts include alkali metal carbonate, bicarbonate, phosphate, borate, sulfate, chloride salt, acetate, butyrate, propionate, heptanoate, caprate, malonate, succinate, adipate, suberate, or sebacate. These can be used alone or in combination of two or more.

The alkali metals used in the present invention include lithium, sodium, potassium, rubidium, and cesium. These can be used alone or in combination of two or more. Among them, sodium and potassium are preferred, and sodium is particularly preferred.

The EVOH resin composition may have an alkali metal content of about 5-550 ppm. The alkali metal content can be, for example, 5-550 ppm, about 5-500 ppm, about 5-450 ppm, about 5-400 ppm, about 5-350 ppm, about 5-300 ppm, about 5-250 ppm, about 5-200 ppm, about 5-150 ppm, about 5-100 ppm, about 5-50 ppm, about 10-550 ppm, about 10-500 ppm, about 10-450 ppm, about 10-400 ppm, about 10-350 ppm, about 10-300 ppm, about 10-250 ppm, about 10-200 ppm, about 10-150 ppm, about 10-100 ppm, about 10-50 ppm, about 50-550 ppm, about 50-500 ppm, about 50-450 ppm, about 50-400 ppm, about 50-350 ppm, about 50-300 ppm, about 50-250 ppm, about 50-200 ppm, about 50-150 ppm, about 50-100 ppm, about 100-550 ppm, about 100-500 ppm, about 100-450 ppm, about 100-400 ppm, about 100-350 ppm, about 100-300 ppm, about 100-250 ppm, about 100-200 ppm, about 100-150 ppm, about 200-550 ppm, about 200-500 ppm, about 200-450 ppm, about 200-400 ppm, about 200-350 ppm, about 200-300 ppm, about 200-250 ppm, about 300-550 ppm, about 300-500 ppm, about 300-450 ppm, about 300-400 ppm, about 300-350 ppm, about 400-550 ppm, about 400-500 ppm, about 400-450 ppm, or about 500-550 ppm.

Additionally or alternatively, the EVOH resin composition may further include one or a combination of cinnamic acid, conjugated polyene, slip agent and alkaline earth metal, or a salt thereof and/or a mixture thereof. The above-mentioned substances are common substances usually present in the EVOH resin composition, giving it better properties. If the content of the conjugated polyene in the EVOH resin composition per unit weight is 1 to 30000 ppm, the coloration after heating can be further suppressed and the thermal stability can be improved. If the content of the alkali metal compound or alkaline earth metal compound in the EVOH resin composition per unit weight is 1 to 1000 ppm in terms of metal, the long-term operation formability can be improved.

The conjugated polyene is, for example, but not limited to, a conjugated diene composed of a conjugated structure of 2 carbon-carbon double bonds, such as isoprene, 2,3-dimethyl-1,3-butadiene, 2-tert-butyl-1,3-butadiene, 1,3-pentadiene, 2,4-dimethyl-1,3-pentadiene, 3,4-dimethyl-1,3-pentadiene, 3-ethyl-1,3-pentadiene, 2-methyl-1,3-pentadiene, 4-methyl-1,3-pentadiene, 1,3-hexadiene, 2,5-dimethyl-2,4-hexadiene, 1,3-octadiene, 1,3-cyclopentadiene, 1,3-cyclohexadiene, 1,4-diphenyl-1,3-butadiene, 1-methoxy-1,3-butadiene, 2-methoxy-1,3-butadiene, 1-ethoxy-1,3-butadiene, 2-ethoxy-1,3-butadiene, 2-nitro-1,3-butadiene, chloroprene, 1-chloro-1,3-butadiene, 1-bromo-1,3-butadiene, tropone, ocimene, ferrandrene, myrcene, farnesene, sorbic acids (e.g., sorbic acid or sorbate), or abietic acid; or a conjugated triene composed of a conjugated structure of 3 carbon-carbon double bonds, such as 2,4,6-octatriene-1-carboxylic acid, eleostearic acid, tung oil, or cholecalciferol. The conjugated polyene may be used in combination of two or more. Preferable conjugated polyenes are sorbic acids such as sorbic acid and sorbate.

The slip agent used in the present invention may include higher fatty acids, such as higher fatty acid (e.g., oleic acid, lauric acid, palmitic acid, myristic acid, stearic acid, or docosanoic acid); metal salt of higher fatty acid (e.g., aluminum, calcium, zinc, magnesium, or barium salt of the above-mentioned higher fatty acid); ester of higher fatty acid (e.g., methyl, isopropyl, butyl, or octyl ester of the above-mentioned higher fatty acid); saturated higher fatty acid amide (e.g., stearic acid amide or docosanoic acid amide); unsaturated higher fatty acid amide (e.g., oleic acid amide or erucamide); or double higher fatty acid amide (e.g., vinyl bis-stearyl amide, vinyl bis-oleic acid amide, vinyl bis-erucamide, or vinyl bis-lauric acid amide). These can be used alone or in combination of two or more.

The EVOH resin composition is beneficial to more efficiently prepare the EVOH film formed therefrom. Suitable methods and equipment for preparing the EVOH film may include methods and equipment easily understood by those skilled in the art. The inventor believes that by controlling the surface roughness of the EVOH resin composition, the EVOH resin composition can reduce the torque in the extruder, and can also reduce the gel production of the film or multilayer structure formed by the EVOH resin composition, and improve the appearance of the film or multilayer structure formed by the EVOH resin composition.

The EVOH resin composition of the present invention usually has a specific range of moisture content. For example, the moisture content of the EVOH resin composition is evaluated by volatile content. The moisture content of the EVOH resin composition can be less than or equal to 1 wt %, less than 0.9%, less than 0.8%, less than 0.7%, less than 0.6%, less than 0.5%, less than 0.4%, less than 0.3%, less than 0.2%, less than 0.1%, between 0.01 and 1 wt %, between 0.08 and 1 wt %, or between 0.05 and 1 wt %. It was unexpectedly discovered that the moisture content of the EVOH resin composition must be controlled within a certain range, otherwise excessively high moisture content will cause bubbles, uneven film thickness and increased flow marks in the film or multilayer structure formed by the EVOH resin composition, causing problems in subsequent processing. The volatile content was analyzed using the method of ISO 14663-2 Annex A.

In yet another aspect, the present invention provides a multilayer structure having at least one layer formed from the EVOH resin composition of the present invention; at least one polymer layer; and at least one adhesive layer. The polymer layer can be selected from a low-density polyethylene layer, a polyethylene grafted maleic anhydride layer, a polypropylene layer, a nylon layer, and combinations thereof. The adhesive layer may be a tie layer, such as ARKEMA OREVAC 18729 from ARKEMA.

The EVOH resin composition is beneficial to more efficiently prepare the EVOH film formed therefrom. Suitable methods and equipment for preparing the EVOH film may include methods and equipment easily understood by those skilled in the art.

EXAMPLE

The following non-limiting examples of various aspects of the present invention are provided mainly to illustrate the various aspects of the invention and the benefits derived therefrom.

Example 1

A non-limiting preparation method of EVOH pellets formed from the EVOH resin composition is provided as follows. 6 non-limiting example EVOH resin compositions (Example EVOH 1-6) and 4 comparative example EVOH resin compositions (Comparative Example EVOH 1-4) were prepared according to methods similar to the methods disclosed below. However, the specific methods for preparing Example EVOH 1-6 and Comparative Example EVOH 1-4 were generally different from the methods disclosed below in one or more aspects.

Example EVOH 1 Pellets 500 kg of vinyl acetate, 100 kg of methanol, 0.0585 kg of acetyl peroxide, and 0.015 kg of citric acid were put into a polymerization vessel equipped with a cooling coil. After temporarily replacing the inside of the polymerization vessel with nitrogen, it was replaced with ethylene until the pressure of ethylene reached 45 kg/cm$^2$. Under pressure of ethylene, the temperature was raised to 67° C. while stirring to start polymerization. Six hours after the start of the polymerization, when the polymerization rate reached 60%, 0.0525 kg of sorbic acid conjugated polyene as a polymerization inhibitor was added. Thus, an ethylene-vinyl acetate copolymer having an ethylene structural unit content of 44 mole % was obtained. Then, the reaction liquid containing the ethylene-vinyl acetate copolymer was supplied to the distillation tower, and methanol vapor was introduced from the lower part of the tower to remove unreacted vinyl acetate, thereby obtaining a methanol solution of the ethylene-vinyl acetate copolymer.

A component formed by polymerizing ethylene monomer and vinyl acetate monomer (i.e., ethylene-vinyl acetate copolymer, hereinafter referred to as "EVAC" polymer) was saponified to prepare EVOH polymer, and the degree of saponification was 99.5%. Subsequently, EVOH was dissolved in a solution with a ratio of methanol to water of 60:40. The EVOH/methanol/water solution was placed at 60° C. for 1 hour to promote the dissolution of EVOH in the EVOH/methanol/water solution. The solid content of this EVOH/methanol/water solution was 41 wt %.

Then the solution of methanol, water and EVOH was pelletized through underwater pelletization. Specifically, the solution of methanol, water and EVOH was pumped into the feed pipe using a pump at a flow rate of 120 L/min, and then fed into the input pipe with a diameter of 2.8 mm, and then cut with a rotary knife at 1500 rpm to obtain EVOH pellets. At the same time, 5° C. circulating condensate water was used to cool EVOH pellets. Subsequently, the EVOH pellets were centrifuged to separate EVOH particles, and the separated EVOH particles were washed with water. Next, the EVOH particles were immersed in a boric acid/sodium acetate solution and then dried and added with calcium stearate to obtain round EVOH pellets with a long side of 3.0 mm and a short side of 2.4 mm. Finally, the pellets were conveyed and bagged.

The conveying and bagging were carried out under the following conditions: the moisture content of EVOH pellets was 0.01%, the conveying method was air conveying, the diameter of the pipeline was 3 inches, the number of elbows was 2, the length of the pipeline was 20 m, the conveying speed was 40 m/min, and the moisture content of EVOH pellets after bagging was also 0.01%.

Example EVOH 2 Pellets

The EVOH pellets used in Example EVOH 2 were prepared using a process similar to that of Example EVOH 1 pellets. However, the EVOH pellets of Example EVOH 2 were round pellets with a long side of 1.5 mm and a short side of 1.5 mm. In addition, the conveying and bagging were carried out under the following conditions: the moisture content of Example EVOH 2 was 0.2%, the conveying method was air conveying, the diameter of the pipeline was 2.5 inches, the number of elbows was 4, the length of the pipeline was 15 m, the conveying speed was 20 m/min, and the moisture content of EVOH pellets after bagging was also 0.2%.

Example EVOH 3 Pellets

The EVOH pellets used in Example EVOH 3 were prepared using a process similar to that of Example EVOH 1 pellets. However, the EVOH pellets of Example EVOH 3 were round pellets with a long side of 5.0 mm and a short side of 5.0 mm. In addition, the conveying and bagging were carried out under the following conditions: the moisture content of Example EVOH 3 was 0.3%, the conveying method was belt conveying, the diameter of the pipeline was 6 inches, the roughness (Rz) of the belt was 15 the number of elbows was 3, the length of the pipeline was 10 m, the conveying speed was 30 m/min, and the moisture content of EVOH pellets after bagging was also 0.3%.

Example EVOH 4 Pellets

The EVOH pellets used in Example EVOH 4 were prepared using a process similar to that of Example EVOH 1 pellets. However, when preparing the EVOH pellets of Example EVOH 4, the conveying and bagging were carried out under the following conditions: Example EVOH 4 had an ethylene content of 28 mole % and a moisture content of 0.08%, the conveying method was belt conveying, the diameter of the pipeline was 6 inches, the roughness (Rz) of the belt was 21 the number of elbows was 0, the length of the pipeline was 20 m, the conveying speed was 10 m/min, and the moisture content of the EVOH pellets after bagging was also 0.08%.

Example EVOH 5 Pellets

The EVOH pellets used in Example EVOH 5 were prepared using a process similar to that of Example EVOH 1 pellets. However, when preparing the EVOH pellets of Example EVOH 5, the conveying and bagging were carried out under the following conditions: Example EVOH 5 had an ethylene content of 28 mole % and a moisture content of 0.7%, the conveying method was belt conveying, the diameter of the pipeline was 5 inches, the roughness (Rz) of the belt was 18 μm, the number of elbows was 2, the length of the pipeline was 20 m, the conveying speed was 7 m/min, and the moisture content of the EVOH pellets after bagging was also 0.7%.

Example EVOH 6 Pellets

The EVOH pellets used in Example EVOH 6 were prepared using a process similar to that of Example EVOH 1 pellets. However, when preparing EVOH pellets of Example EVOH 6, the conveying and bagging were carried out under the following conditions: the moisture content of Example EVOH 6 was 1%, the conveying method was air conveying, the diameter of the pipeline was 3 inches, the number of elbows was 3, the length of the pipeline was 20 m, the conveying speed was 30 m/min, and the moisture content of the EVOH pellets after bagging was also 1%.

Comparative Example EVOH 1 Pellets

The EVOH pellets used in Comparative Example EVOH 1 were prepared using a process similar to that of Example EVOH 1 pellets. However, when preparing the EVOH pellets of Comparative Example EVOH 1, the conveying and bagging were carried out under the following conditions: the moisture content of Comparative Example EVOH 1 was 0.8%, the conveying method was air conveying, the diameter of the pipeline was 2 inches, the number of elbows was 6, the length of the pipeline was 30 m, the conveying speed was 80 m/min, and the moisture content of the EVOH pellets after bagging was also 0.8%.

Comparative Example EVOH 2 Pellets

The EVOH pellets used in Comparative Example EVOH 2 were prepared using a process similar to that of Example EVOH 1 pellets. However, when preparing EVOH pellets of Comparative Example EVOH 2, the conveying and bagging were carried out under the following conditions: the moisture content of Comparative Example EVOH 2 was 0.7%, the conveying method was belt conveying, the diameter of the pipeline was 1 inch, the roughness (Rz) of the belt was 44 the number of elbows was 8, the length of the pipeline was 20 m, the conveying speed was 10 m/min, and the moisture content of the EVOH pellets after bagging was also 0.7%.

Comparative Example EVOH 3 Pellets

The EVOH pellets used in Comparative Example EVOH 3 were prepared using a process similar to that of Example EVOH 1 pellets. However, when preparing EVOH pellets of Comparative Example EVOH 3, the conveying and bagging were carried out under the following conditions: the moisture content of Comparative Example EVOH 3 was 0.05%, the conveying method was belt conveying, the diameter of the pipeline was 8 inches, the roughness (Rz) of the belt was 5 the length of the pipeline was 5 m, the conveying speed was 5 m/min, and the moisture content of the EVOH pellets after bagging was also 0.05%.

Comparative Example EVOH 4 Pellets

The EVOH pellets used in Comparative Example EVOH 4 were prepared using a process similar to that of Example EVOH 1 pellets. However, when preparing EVOH pellets of Comparative Example EVOH 4, the conveying and bagging were carried out under the following conditions: the moisture content of Comparative Example EVOH 4 was 0.4%, the conveying method was belt conveying, the diameter of the pipeline was 2 inches, the roughness (Rz) of the belt was 20 μm, the number of elbows was 5, the length of the pipeline was 20 m, the conveying speed was 50 m/min, and the moisture content of the EVOH pellets after bagging was also 0.4%.

Example 2

The films were respectively formed using the pellets of Example EVOH 1 to 6 according to the following method. The pellets of Example EVOH 1 to 6 and that of Comparative Example EVOH 1 to 4 were sent to a single-layer T-die cast film extruder (optical control system MEV4) to prepare films. The thickness of the films formed from the pellets of Example EVOH 1 to 6 and the pellets of Comparative Example EVOH 1 to 4 were each 20 The temperature of the extruder was set at 220° C., and the temperature of the mold (i.e., T-die) was set at 230° C. The rotation frequency of the screw was 7 rpm (rotations/minutes).

Example 3

The pellets of Example EVOH 1 to 6 and the pellets of Comparative Example EVOH 1 to 4 were evaluated to determine the properties of these EVOH pellets and the films formed therefrom. As described above, the pellets of Example EVOH 1 to 6 were prepared according to a method similar to the method described in Example 1 above. However, the preparation methods of the pellets of Example EVOH 1 to 6 were different for the prepared EVOH pellets in terms of having different Sdq, Sdr, Sa, Sv, Rz, boron content or alkali metal content. The pellets of Comparative Example EVOH 1 to 4 were also prepared according to a method similar to that described in Example 1.

The average torque and current of the single screw extruder were further evaluated. The films were individually formed from Example EVOH 1 to 6 and Comparative Example EVOH 1 to 4 according to a method similar to that described in Example 2, and were evaluated to determine the size and amount of gel on the film. The gel refers to the gel or protrusion induced by the increase in viscosity or gelation of EVOH when it is made into a film.

The following Table 1 provides a summary of some attributes (i.e., Sdq, Sdr, Sa, Sv, Rz, boron content, alkali metal content, average torque of extruder, and current of extruder) of the pellets of Example EVOH 1 to 6 and Comparative Example EVOH 1 to 4, as well as the conditions of gel generation on the films formed from Example EVOH 1 to 6 and Comparative Example EVOH 1 to 4.

tific). The boron content refers to the measured value corresponding to the boron content derived from the boron compound used.

In addition, the alkali metal content in the EVOH pellets of the respective Examples and Comparative Examples was also measured. 2 g of the above-mentioned EVOH pellets were put into a platinum dish, added with a few milliliters of sulfuric acid, and then heated with a gas burner. After confirming that the pellets were carbonized and the sulfuric acid white smoke disappeared, the substance was added with a few drops of sulfuric acid and then heated again. This operation was repeated until the organic matter disappeared and the matter was completely ashed. After ashing, the platinum dish was cooled, and 1 mL of hydrochloric acid was added to dissolve the substance. This hydrochloric acid solution was washed with ultrapure water and the volume was made up to 50 mL. The alkali metal content in this sample solution was determined by inductively coupled plasma atomic emission spectrometry (ICP-AES; 720-ES, Agilent Technology). Finally, the alkali metal content in the above-mentioned EVOH composition pellets was converted from the alkali metal concentration in the solution.

TABLE 1

|  | Example EVOH 1 | Example EVOH 2 | Example EVOH 3 | Example EVOH 4 | Example EVOH 5 | Example EVOH 6 |
| --- | --- | --- | --- | --- | --- | --- |
| Sdq | 0.001 | 0.1 | 1.1 | 3.3 | 9.23 | 8.15 |
| Sdr (%) | 0.1 | 2.2 | 11.3 | 50.2 | 99.2 | 96.3 |
| Sa (μm) | 0.005 | 0.03 | 0.08 | 0.32 | 0.94 | 0.91 |
| Sv (μm) | 0.01 | 0.45 | 1.1 | 3.1 | 5 | 4.8 |
| Rz (μm) | 0.021 | 0.899 | 9.34 | 0.644 | 5.41 | 13.24 |
| boron content (ppm) | 130 | 210 | 10 | 490 | 380 | 240 |
| sodium content (ppm) | 240 | 170 | 10 | 210 | 320 | 130 |
| 0-100 μm gel | ◯ | ◯ | ◯ | ◯ | ◯ | Δ |
| 100-200 μm gel | ◯ | ◯ | ◯ | Δ | ◯ | ◯ |
| >200 μm gel | ◯ | ◯ | ◯ | ◯ | ◯ | ◯ |
| average torque of single screw extruder (Torque) | 21 | 44 | 31 | 52 | 38 | 65 |
| current of single screw extruder (Å) | 34 | 52 | 46 | 67 | 44 | 77 |

|  | Comparative Example EVOH 1 | Comparative Example EVOH 2 | Comparative Example EVOH 3 | Comparative Example EVOH 4 |
| --- | --- | --- | --- | --- |
| Sdq | 19 | 33.2 | 0.0003 | 18.35 |
| Sdr (%) | 135.6 | 221.4 | 0.001 | 112.7 |
| Sa (μm) | 6.3 | 7.7 | 0.001 | 2.34 |
| Sv (μm) | 15 | 20 | 0.004 | 12 |
| Rz (μm) | 11.05 | 29.73 | 0.01 | 3.66 |
| boron content (ppm) | 310 | 250 | 130 | 50 |
| sodium content (ppm) | 110 | 200 | 40 | 140 |
| 0-100 μm gel | ◯ | ◯ | X | ◯ |
| 100-200 μm gel | X | X | ◯ | X |
| >200 μm gel | X | X | ◯ | ◯ |
| average torque of single screw extruder (Torque) | 179 | 192 | 10 | 83.2 |
| current of single screw extruder (Å) | 317 | 412 | 11 | 95.3 |

The boron content of each Example and Comparative Example was measured by the following method. First, a sample of 0.1 g EVOH pellets was decomposed by concentrated nitric acid and microwave to make EVOH pellets form a sample solution. Then the sample solution was diluted with pure water to adjust its concentration to 0.75 mg/mL. The boron content in the sample solution was measured using inductively coupled plasma optical emission spectrometry (ICP-OES; iCAP7000, Thermo Fisher Scien- In order to evaluate the surface roughness of Example EVOH 1-6 pellets and Comparative Example EVOH 1-4 pellets, the EVOH pellets were placed flat on the board, and the surface roughness of the pellets was measured. When measuring, it was necessary to exclude the data when the inclination was greater than 0.5 to ensure that the scanning plane was relatively horizontal. Inclination=Maximum surface height Sz/Side length of the analysis range (i.e., 129 μm). The laser microscope was LEXT OLS5000-SAF manufactured by Olympus, and the image was made at an air temperature of 24±3° C. and a relative humidity of 63±3%. The filter was set to no filter. The light source was a light source with a wavelength of 405 nm. The objective lens was a 100× magnifying glass (MPLAPON-100xLEXT). The optical zoom was set to 1.0×. The image area was set to 129 μm×129 μm. (When measuring Rz, the center line of the image area was taken.) The resolution was set to 1024 pixels×1024 pixels. The value of 100 pellets was measured and the average value was taken. Among them, Sdq, Sdr, Sa and Sv were measured by the method of ISO 25178:2012, and Rz was measured by the method of JIS B 0601-2001.

Calculation of the torque and current of the extruder during the processing of Example EVOH 1-6 and Comparative Example EVOH 1-4: When EVOH pellets were extruded with the single screw extruder (model: ME25/5800V4, brand: OCS), the torque value and current value of the extruder were measured. The extrusion conditions were as follows: the temperature of the screw was Zone1 195° C., Zone2 215° C., Zone3 220° C., Zone4 230° C., and Zone5 230° C.; and the rotation speed of the screw was 7 rpm. The calculation time was 10 to 60 minutes, and 1 point was recorded every 1 minute, and then the average value was calculated.

After Example EVOH 1 to 6 and Comparative Example EVOH 1 to 4 were processed into single-layer films, the FSA-100 film quality test system was used to analyze the number of gels on the single-layer films, and the evaluation criteria were used to evaluate them. The size of the gel formed was divided into three categories. The first type was gels smaller than 100 μm: if the number of the gel was less than 450, "O" was marked as "excellent"; if the number of the gel was 450-1000, "Δ" was marked as "acceptable"; and if the number of the gel was greater than 1000, "X" was marked as "poor". The second type was that the gel size was between 100 and 200 μm: if the number of the gel was less than 50, "O" was marked as "excellent"; if the number of the gel was 50-100, "Δ" was marked as "acceptable"; and if the number of the gel was greater than 100, "X" was marked as "poor". The third type was gels larger than 200 μm: if the number of the gel was less than 10, "O" was marked as "excellent"; if the number of the gel was 10-20, "Δ" was marked as "acceptable"; and if the number of the gel was more than 20, "X" was marked as "poor".

The results show that Example EVOH 1 to 6 have lower torque output (21 to 52 Torque), current (34 to 67 Å) and less gel formation. On the films formed by Example EVOH 1 to 6, the number of gels smaller than 100 μm is less than 450, the number of gels of 100-200 m is less than 100, and the number of gels larger than 200 μm is less than 10. It is shown that Example EVOH 1 to 6 exhibit excellent processing torque output and film characteristics.

The inventor found that if the surface roughness of the EVOH pellets is too high, when the pellets are processed by a single screw and friction occurs, local overheating is likely to cause cross-linking, and large gels are likely to be generated during processing. If the surface roughness of the EVOH pellets is too low, the EVOH will not be able to melt due to insufficient frictional heat during processing, and tiny gels will be produced after extrusion. Therefore, it is necessary to control the surface roughness of the EVOH pellets within a certain range to avoid gel formation.

Comparing the examples and the comparative examples through Table 1: in Comparative Example EVOH 1, due to the excessive number of elbows, the excessively long pipeline length, and the excessively fast conveying speed, the pellets collided and rubbed each other, resulting in higher surface roughness; in Comparative Example EVOH 2, because the size of the pipeline was too small, the roughness of the belt was too high, and the number of elbows was too large, the pellets collided and rubbed each other, resulting in higher surface roughness; and in Comparative Example EVOH 3, due to the excessive size of the pipeline, the low roughness of the belt, the short length of the pipeline, and the slow conveying speed, the surface roughness of the pellets was insufficient.

The inventor found that the desired surface roughness of the present invention can be obtained by adjusting the variable factors of the conveying procedure when processing EVOH pellets. In detail, if the size of the pipeline is too small, the roughness of the belt is too high, the number of elbows is too much, the length of the pipeline is too long, the conveying speed is too fast, etc., it will cause collision and friction of particles/pellets during conveying, which will increase the roughness of EVOH pellets.

The test results show that as long as the surface roughness of EVOH is controlled within a specific range, the torque and current in the single screw extruder and the gel production of the EVOH film can be reduced. As shown in Table 1, Comparative Example EVOH 1, 2 and 4 have Sdq, Sdr, Sa and Sv beyond the expected range described herein, and all have higher extruder torque output and extruder current, and the films formed by them produces too much gel. Comparative Example EVOH 3 has Sdq, Sdr, Sa and Sv below the expected range described herein; although the test results show that it has good torque output and current, the film formed by Comparative Example EVOH 3 produces too much gel and has undesirable properties.

In summary, the EVOH resin composition of the present invention has a low surface roughness, especially its surface roughness is the Sdq between 0.0005 and 13. The control of the surface roughness of the EVOH resin composition can be achieved by manipulating the variable factors in the conveying stage of the EVOH process. The EVOH resin composition can be used to prepare films or multilayer structures. The inventor found that by controlling the surface roughness of EVOH pellets, the torque output during processing can be reduced, and the friction between the pellets or between the pellets and the screw can be reduced, which not only makes the appearance of the film highly uniform, but also reduces energy consumption.

As used herein, all ranges provided are meant to include every specific range within, and combination of sub ranges between, the given ranges. Additionally, all ranges provided herein are inclusive of the end points of such ranges, unless stated otherwise. Thus, a range from 1 to 5 includes specifically 1, 2, 3, 4, and 5, as well as sub ranges such as 2-5, 3-5, 2-3, 2-4, 1-4, etc.

All publications and patent applications cited in this specification are herein incorporated by reference, and for any and all purposes, as if each individual publication or patent application is specifically and individually indicated to be incorporated by reference. In the event of an inconsistency between the present disclosure and any publication or patent application incorporated herein by reference, the present disclosure controls.

As used herein, the terms "comprising," "having," and "including" are used in their open and non-limiting sense. The terms "a," "an," and "the" are understood to encompass the plural as well as the singular. The expression "one or more" means "at least one" and thus may include an individual characteristic or mixtures/combinations.

Other than in the operating examples, or where otherwise indicated, all numbers expressing quantities of ingredients and/or reaction conditions may be modified in all instances by the term "about," meaning within ±5% of the indicated number. The term "substantially free" or "essentially free" as used herein means that there is less than about 2% of the specific characteristic. All elements or characteristics positively set forth in this disclosure can be negatively excluded from the claims.

What is claimed is:

1. An ethylene-vinyl alcohol copolymer resin composition in the form of pellet comprising an ethylene-vinyl alcohol copolymer resin, wherein the ethylene-vinyl alcohol copolymer resin composition has a surface with a root mean square gradient (Sdq) ranging from 0.0005 to 13 and its largest outer diameter or long axis is 1.5 to 5.0 mm.

2. The ethylene-vinyl alcohol copolymer resin composition of claim 1, wherein the surface of the ethylene-vinyl alcohol copolymer resin composition has a developed interfacial area ratio (Sdr) ranging from 0.05% to 110%.

3. The ethylene-vinyl alcohol copolymer resin composition of claim 1, wherein the surface of the ethylene-vinyl alcohol copolymer resin composition has a surface arithmetic mean height (Sa) ranging from 0.003 to 1.5 μm.

4. The ethylene-vinyl alcohol copolymer resin composition of claim 1, wherein the surface of the ethylene-vinyl alcohol copolymer resin composition has a surface maximum trough depth (Sv) ranging from 0.005 to 8 μm.

5. The ethylene-vinyl alcohol copolymer resin composition of claim 1, wherein the ethylene-vinyl alcohol copolymer resin has an ethylene content of 20 to 48 mole %.

6. The ethylene-vinyl alcohol copolymer resin composition of claim 1, wherein the ethylene-vinyl alcohol copolymer resin has a saponification degree greater than 99.5 mole %.

7. The ethylene-vinyl alcohol copolymer resin composition of claim 1, wherein the surface has a maximum line height (Rz) between 0.02 and 15 μm.

8. The ethylene-vinyl alcohol copolymer resin composition of claim 1, wherein the surface has a maximum line height (Rz) between 0.02 and 9.9 μm.

9. The ethylene-vinyl alcohol copolymer resin composition of claim 1 having a moisture content of less than or equal to 1 wt %.

10. The ethylene-vinyl alcohol copolymer resin composition of claim 1 having a boron content of 5 to 550 ppm.

11. The ethylene-vinyl alcohol copolymer resin composition of claim 1 having an alkali metal content of 5 to 550 ppm.

12. The ethylene-vinyl alcohol copolymer resin composition of claim 1 further comprising one or a combination of the group consisting of cinnamic acid, conjugated polyene, slip agent and alkaline earth metal.

* * * * *